US011857847B2

(12) United States Patent
Kuntimaddi et al.

(10) Patent No.: US 11,857,847 B2
(45) Date of Patent: Jan. 2, 2024

(54) GOLF BALL HAVING OVERLAP MARKINGS

(71) Applicant: Acushnet Company, Fairhaven, MA (US)

(72) Inventors: Manjari Kuntimaddi, Raynham, MA (US); Vincent J. Simonds, Brimfield, MA (US)

(73) Assignee: Acushnet Company, Fairhaven, MA (US)

( * ) Notice: Subject to any disclaimer, the term of this patent is extended or adjusted under 35 U.S.C. 154(b) by 67 days.

(21) Appl. No.: 17/591,203

(22) Filed: Feb. 2, 2022

(65) Prior Publication Data

US 2023/0310951 A1 Oct. 5, 2023

(51) Int. Cl.

*A63B 45/02* (2006.01)
*B41M 1/40* (2006.01)
*A63B 37/00* (2006.01)

(52) U.S. Cl.

CPC .......... *A63B 45/02* (2013.01); *A63B 37/0022* (2013.01); *B41M 1/40* (2013.01)

(58) Field of Classification Search

CPC ....... A63B 37/0022; A63B 45/02; B41M 1/40
See application file for complete search history.

(56) References Cited

U.S. PATENT DOCUMENTS

| | | | | |
|---|---|---|---|---|
| 5,778,793 | A | 7/1998 | Mello et al. | |
| 8,899,718 | B2 * | 12/2014 | Yamada | B41M 1/06 347/101 |
| 2004/0089184 | A1 | 5/2004 | Lampinski et al. | |
| 2005/0218020 | A1 * | 10/2005 | Lucas | B65D 5/4216 206/315.9 |
| 2018/0207969 | A1 * | 7/2018 | Sato | B41M 1/10 |

* cited by examiner

*Primary Examiner* — Jill E Culler
(74) *Attorney, Agent, or Firm* — Steven Landolfi, Jr.

(57) ABSTRACT

A first stamp and a second stamp are printed on the surface of a golf ball such that a transition printed area of the first stamp overlaps a transition printed area of the second stamp to create an overlap printed area between a main printed area of the first stamp and a main printed area of the second stamp. An ink density of the main printed area of the first stamp, an ink density of the main printed area of the second stamp, and an ink density of the overlap printed area are approximately the same after both the first stamp and the second stamp are printed on the surface of the golf ball.

16 Claims, 11 Drawing Sheets

GOLF BALL HAVING OVERLAP MARKINGS

FIELD OF THE INVENTION

The present disclosure relates generally to a golf ball having markings, and, more particularly, to pad printing multiple markings in which a portion of the markings are printed in the same location to produce an overlap printed area that has a desired appearance relative to adjacent printed areas comprised of a single stamp.

BACKGROUND OF THE INVENTION

Golf balls include various printed markings, such as side stamps, logos, identifiers, and alignment aids. As a length of the printing gets longer, the marking design may require sectioning in order to be able to print around the ball. In other words, some individual markings cannot be printed with only one pad printing stamp and instead require stamps at different sites on the golf ball. For example, designs for alignment aids that extend around an eighth (e.g., 45°) or more of a centerline of the golf ball may require at least two connected stamps at corresponding sites on the golf ball.

In order to connect the multiple stamps and create a continuous marking, certain knitting/overlap is necessary in order to ensure the alignment aid is consistent in its direction. However, when markings are overlapped on a golf ball, the site of overlap is very evident in darkness of ink color and thus the appearance of the marking on the golf ball is suboptimal.

The disclosed embodiments include designs for markings that can be used to improve the appearance of markings on golf balls that require more than one pad printing stamp at different sites on the golf ball.

SUMMARY OF THE INVENTION

In some embodiments, the present disclosure describes a method for printing a marking on a golf ball. The method includes arranging a golf ball relative to a first printing pad for printing at a first site on a surface of the golf ball, printing a first stamp on the first site with the first printing pad, wherein the first stamp comprises a main printed area and a transition printed area, arranging the golf ball relative to a second printing pad for printing at a second site on the surface of the golf ball, and printing a second stamp on the second site with the second printing pad, wherein the second stamp comprises a main printed area and a transition printed area. The first stamp and the second stamp are printed on the surface of the golf ball such that the transition printed area of the first stamp overlaps the transition printed area of the second stamp to create an overlap printed area between the main printed area of the first stamp and the main printed area of the second stamp. An ink density of the main printed area of the first stamp, an ink density of the main printed area of the second stamp, and an ink density of the overlap printed area are approximately the same after both the first stamp and the second stamp are printed on the surface of the golf ball.

In other embodiments, the present disclosure describes a golf ball. The golf ball includes a linear marking printed on a surface of the golf ball extending in a circumferential direction around at least 60° of the golf ball. The linear marking includes a first stamp and a second stamp. The first stamp includes a main printed area and a transition printed area, and the second stamp includes a main printed area and a transition printed area. The first stamp and the second stamp are printed on the surface of the golf ball such that the transition printed area of the first stamp overlaps the transition printed area of the second stamp to create an overlap printed area between the main printed area of the first stamp and the main printed area of the second stamp. An ink density of the main printed area of the first stamp, an ink density of the main printed area of the second stamp, and an ink density of the overlap printed area are approximately the same.

In some other embodiments, the present disclosure describes another golf ball. The golf ball includes a stamp printed on a surface of the golf ball and extending in a first circumferential direction around at least 30° of a great circle of the golf ball. The stamp includes a main printed area and a transition printed area. The transition printed area includes 5-85% of an ink density of the main printed area.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION OF THE INVENTION

Golf balls often include printed markings at various locations on the surface. There are several printing methods for applying the markings, including pad printing and laser jet printing, for example. In pad printing, ink is deposited onto a plate and arranged in a pattern corresponding to the markings to be made on the golf ball. A pad contacts the plate and thereby receives the ink on the pad surface. The ink is then transferred from the pad to the golf ball by pressing the inked pad onto the golf ball to produce a stamp. A “stamp” or “marking,” as used herein, refers to the printed area produced by application of an ink-carrying pad to a surface of an item, such as a golf ball. A “single stamp” or “single marking” refers a printed area produced by only one application of an ink-carrying pad onto the item. Pad printing is an indirect intaglio process. Depressions are created in a flat block called “the plate” or pad printing cliche. The depressions are filled with ink and a smooth, resilient stamp block of silicone rubber takes up ink from the plate and transfers it to the golf ball. A “etching pattern,” as used herein, refers to the wells and/or depressions in a printing plate arranged in a pattern corresponding to a desired marking to be ultimately printed on an item.

Figure 1:
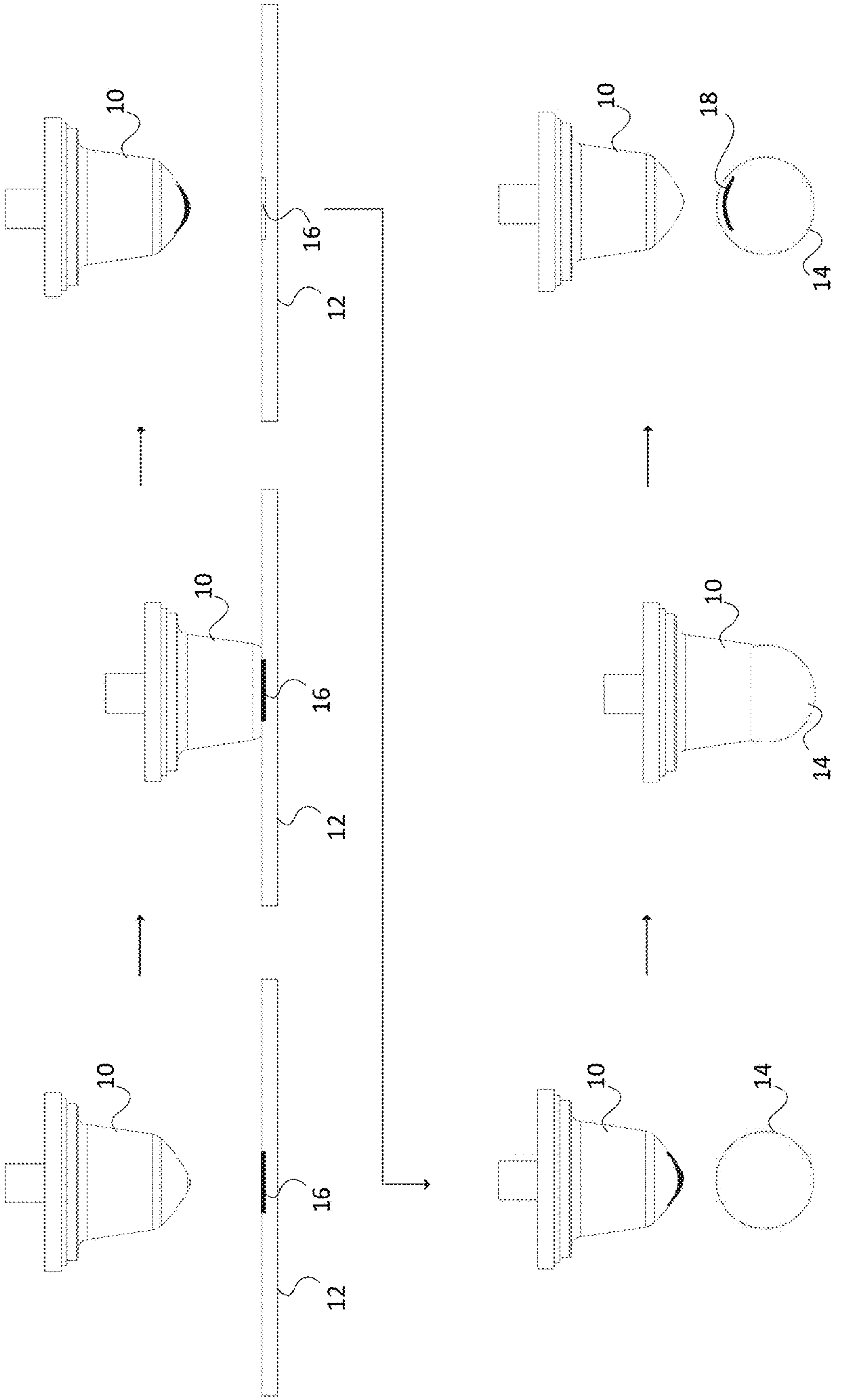
Fig. 1 PRIOR ART
FIG. 1 is a diagram of a pad printing process that is representative of a printing process known in the art.

In some embodiments, a pad printing process begins by spreading ink across the surface of a plate using a spatula. The ink is then scraped back into the ink reservoir using a doctor blade which leaves ink in the depressions on the plate. Thinner evaporates from the ink lying in these depressions and the ink surface becomes tacky. As the pad passes over the depressions, ink will stick to the pad. As the pad lifts, it takes with it not only the tacky, adhering film, but also some of the more fluid ink underneath. This film of ink is carried to the target area on the dimpled golf ball surface. On the way, more of the thinner evaporates from the exposed, surface of the ink on the silicone pad, and the ink surface facing away from the pad becomes tacky. As the pad is applied to the golf ball, the film of ink sticks to the ball surface, and separates from the pad as it is raised FIG. 1 is a diagram of an exemplary pad printing process. The pad printing process includes a pad 10, a printing plate 12, and a golf ball 14. The pad printing process generally includes an etching pattern 16 formed in the printing plate 12. The etching pattern 16 may correspond to a stamp or marking 18 to be ultimately printed on the golf ball 14. The etching pattern 16 may include depressions or wells formed in a surface of the printing plate 12 and a selected ink may fill the wells. The depressions or wells may have an etch depth, which may vary throughout the etching pattern 16. In a first shown step, the pad 10 may be arranged above the etching pattern 16 on the printing plate 12. The process continues with the pad 10 contacting the printing plate 12 such that the ink arranged in the etching pattern 16 is transferred to the surface of the pad 10 when the pad 10 is removed from the printing plate 12. The golf ball 14 is then positioned beneath the pad 10. The golf ball 14 may be aligned such that the ink on the pad 10 is directly above the portion of the surface of the ball to be stamped. The pad 10 is then moved into contact with the golf ball 14 to transfer the ink from the pad 10 to the surface of the golf ball 14. The resulting stamped golf ball 14 includes a marking 18 that corresponds to the etching pattern 16 on the printing plate 12. The process may be repeated to print additional markings on the golf ball 14, including markings at other locations by rotating the golf ball 14 before printing again.

Disclosed embodiments by use any type of ink suitable for printing on a golf ball. There are numerous types of inks available within the printing industry, such as solvent evaporating inks, oxidation curing inks, reactive (catalyst curing or dual-component) inks, baking inks, UV curable inks, sublimation inks, and ceramic and glass inks.

Solvent-based inks are predominant in the pad-printing industry, as they dry very rapidly through solvent evaporation alone. They are very versatile inks, as they are available in both gloss and matte finishes and perform very well with many thermoplastic substrates. Oxidative curing inks have limited uses in pad-printing applications due to their slow drying speed. They do, however, produce very tough, flexible, weather-resistant ink films and are very useful for printing onto metal and glass surfaces.

It is possible to use 1-component inks because their long shelf life can make them easier to work with and more economical. Some 1-component inks are highly resistant to abrasion and solvents. Curing can take place physically or by oxidation.

Dual-component inks are also used extensively in pad-printing and contain resins capable of polymerization. These inks cure very rapidly, especially when heated and are generally good for printing on substrates such as metals, some plastics, and glass, and have very good chemical and abrasion resistance. The inks, though, do have a restricted shelf life once the polymerization catalyst has been added. With 2-component inks, curing typically takes place over about a 5-day period at a temperature of about 20° C., or over about a 10-minute period at a temperature of about 100° C.

Ceramic and gas (thermo) diffusion inks are also used in the pad-printing industry. These inks are solid at room temperature and must be heated in the ink reservoir to a temperature greater than about 80° C. Unlike solvent evaporating inks, pad wetting occurs due to the cooling effect the pad has on the heated ink rather than because of the evaporation of solvent. Ink transfer occurs because the outer surface of the ink becomes tacky when exposed to air. The ink transfer is aided by the cooler surface of the substrate to be printed on.

Ultraviolet ink can also be used in the present invention. UV inks are typically cured by means of UV light having wavelengths of from about 180 nm to 380 nm. The advantages of using a UV ink are that they are fast and cure thoroughly, they are easy to use and are not affected by small changes in ambient conditions, they retain constant viscosity (i.e., they do not dry up quickly), and they use smaller amounts of combustible organic solvent, such that little or no solvent fumes escape into the working environment and are, therefore, environmentally safer. Small amounts of solvent may be added to the UV inks for certain application to enable the ink to transfer in a conventional manner.

The inks may optionally contain additives such as binders, reactive prepolymers, thinners, low-viscosity mono and poly-functional monomers, photoinitiators to stimulate polymerization, stabilizing additives, flow control agents, wetting agents, pigments, extenders, or combinations thereof.

The film of ink is transferred to the predetermined three-dimensional surface. In a preferred embodiment, the surface is the dimpled surface of a golf ball. In an alternative embodiment, other three-dimensional surfaces, such as golf clubs and golf shoes, are possible. The color logo or image may be printed over or under a clearcoat. Preferably, the color indicia is printed under the clearcoat. After the printing process is complete, the three-dimensional objects may be removed to a dry room to finally cure the ink used for the logo. The dry room is maintained at an elevated temperature to aid in drying the logo ink.

The thickness of the ink film transferred to a golf ball can be any thickness that is sufficient to provide a clear image of the logo and can vary with the ink type and color. The thickness of the ink film is also influenced by the viscosity of the ink, the pad material, the depth of etching in the plate, and environmental factors, such as temperature, humidity, and so on. This thickness can be between about 5 μm and 75 μm, but is not limited thereto.

Figure 2:
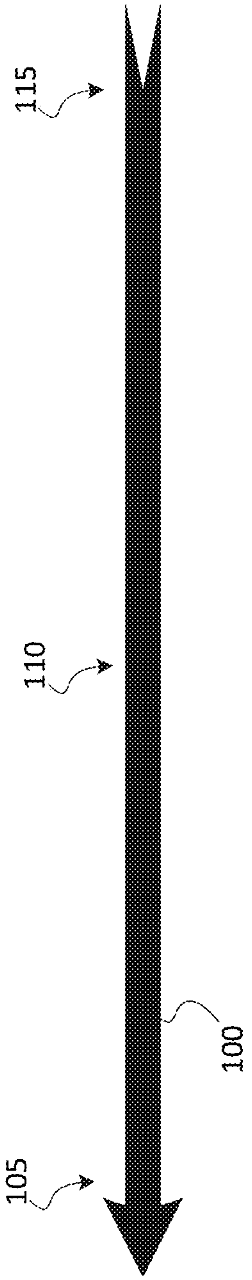
FIG. 2 is an exemplary design for a finished linear marking for a golf ball, consistent with disclosed embodiments.
Figure 3C:
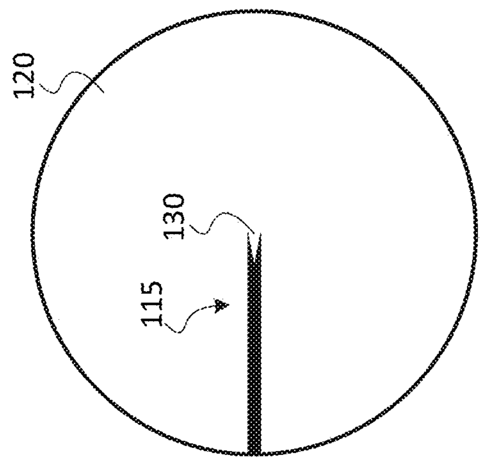
FIGS. 3A-3C depict the finished linear marking of FIG. 2 printed on a golf ball, consistent with disclosed embodiments.
Figure 3B:
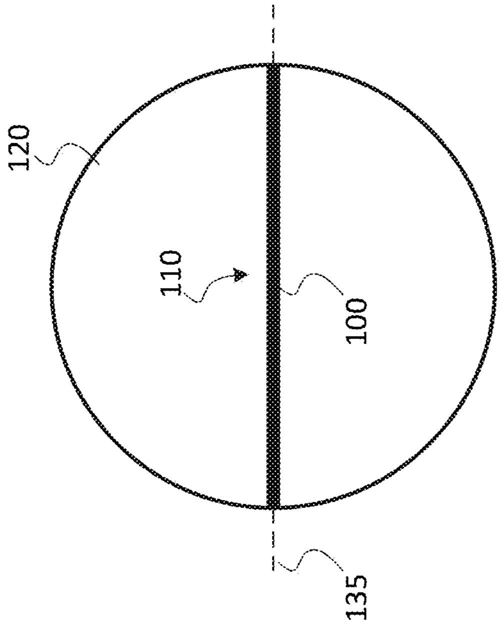
Figure 3A:
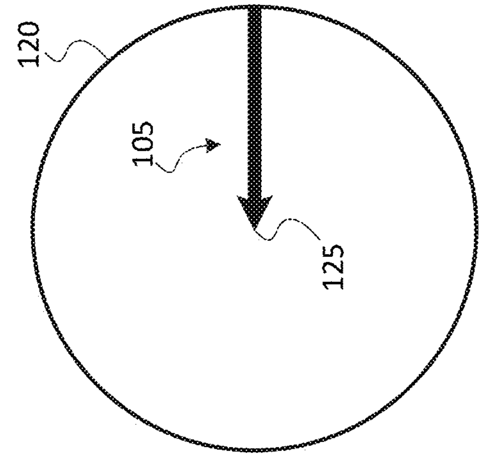

While many stamp designs can be printed with a single pad hit onto the golf ball, there are some designs that cover a larger surface area of the golf ball and cannot be produced as one stamp. For example, a stamp design that extends more than approximately 60° around a great circle of a golf ball likely requires more than one pad hit to produce the entire marking. For example, a first stamp may cover 30-90° while a second stamp may cover an additional 30-90° in the same circumferential direction along a great circle of the golf ball to produce a stamp covering 60-180° of the great circle. In other embodiments, more than two stamps covering at least 30° each may be used to produce a linear marking extending up to 360° around a perimeter (e.g., a great circle or other continuous line) of the golf ball. FIG. 2 is an example of such a linear marking 100 in the form of a linear arrow having a first end section 105, a middle section 110, and a second end section 115. As shown in FIGS. 3A-3C, the marking 100 may be designed to extend approximately 180° around a centerline of a golf ball 120.

In FIG. 3A, the first end section 105 terminates at a first location 125 of the golf ball 120 and transitions into the middle section 110 to continue around a great circle of the golf ball 120, as shown in FIG. 3B. The middle section 110 transitions into the second end section 115, which terminates at a second location 130 of the golf ball 120. In an exemplary embodiment, the first location 125 and the second location 130 are connected by an axis 135 of the golf ball 120 and thus are located 180° from each other around a great circle of the golf ball 120. However, the first location 125 and the second location 130 may be any two points on the golf ball 120. With the marking 100 extending to opposite sides of the golf ball 120, it cannot be printed onto the golf ball 120 as a single stamp. Instead, multiple stamps applied at different sites on the golf ball 120 are necessary to create the marking 100.

Figure 4C:
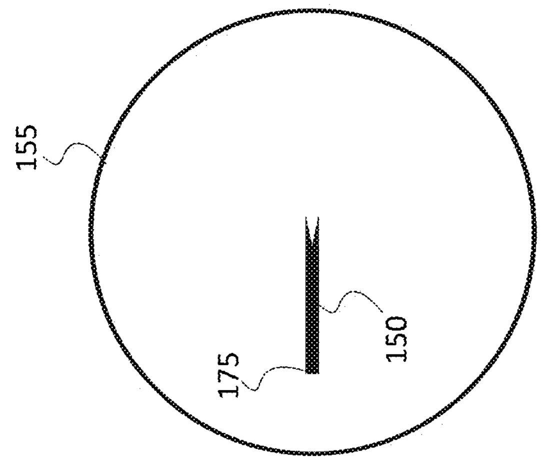
FIGS. 4A-C depict single-stamp printed areas at different sites of a golf ball, consistent with disclosed embodiments.
Figure 4B:
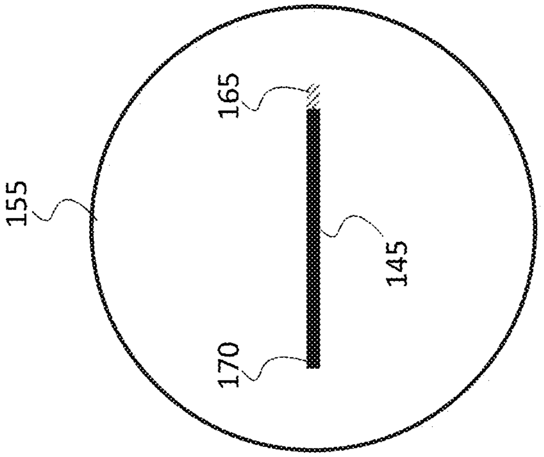
Figure 4A:
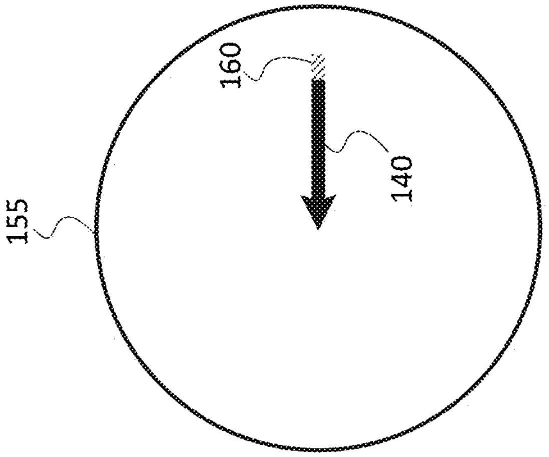

FIGS. 4A-4C illustrate three separate markings 140, 145, 150, respectively, that can be applied to a golf ball 155 to create the linear marking 100. FIG. 4A is a front view of the golf ball 155, FIG. 4B is a side view of the golf ball 155, rotated 90° from the front view, and FIG. 4C is a rear view of the golf ball 155, rotated 90° from the side view. The marking 140 is a first end section stamp, the marking 145 is a middle section stamp, and the marking 150 is a second end section stamp. When combined, the single markings 140, 145, 150 appear as the combined marking 100 shown in FIGS. 3A-3C. The markings 140, 145, 150 may be applied to the golf ball 155 separately using a pad printing process at three sites on the golf ball 155. For example, a first pad may apply the marking 140 to a first site, a second pad may apply the marking 145 to a second site, and a third pad may apply the marking 150 to a third site. The golf ball 155 may be rotated between printing on the various sites or may remain stationary for pads printing from different angles. The three pads used for the markings 140, 145, 150 may be the same or different in various embodiments.

In order to produce a continuous marking that does not appear to be made up of different stamps, certain overlap and/or knitting features may be included with the separate stamps to ensure the linear marking is consistent in its appearance and direction around the golf ball. Disclosed embodiments include designs for stamps and printing plates having overlap sections that aid in alignment of the single stamps relative to each other and produce combined markings that do not show evidence of being composed of multiple, separate stamps. For example, the disclosed embodiments include features that match an ink density between main printed areas, composed of a single stamp and overlap printed areas composed of multiple stamps, thereby rendering the main printed areas and overlap printed areas visually identical to an desired standard.

In FIGS. 4A-4C, markings 140 and 145 include transition printed areas 160, 165, respectively. The transition printed area 160 is positioned at an end of the marking 140 and is configured to overlap a first end 170 of the marking 145. The transition printed area 165 is positioned at an end of the marking 145 and is configured to overlap a first end 175 of the marking 150. The transition printed areas 160, 165 provide a guide for aligning and connecting the markings 140, 145, 150 to form one continuous line. In addition, the overlap sections 160, 165 include a “screened” appearance to inhibit excessive darkening of the area on the golf ball 55 where the overlap sections 160, 165 are printed. While the first ends 170, 175 are shown as color-matching the remainder of the markings 140, 145, respectively, these printed areas can also be considered transition printed areas because they overlap the transition printed areas 160, 165 when all of the markings 140, 145, 150 are printed on the golf ball 155.

Figure 5A:
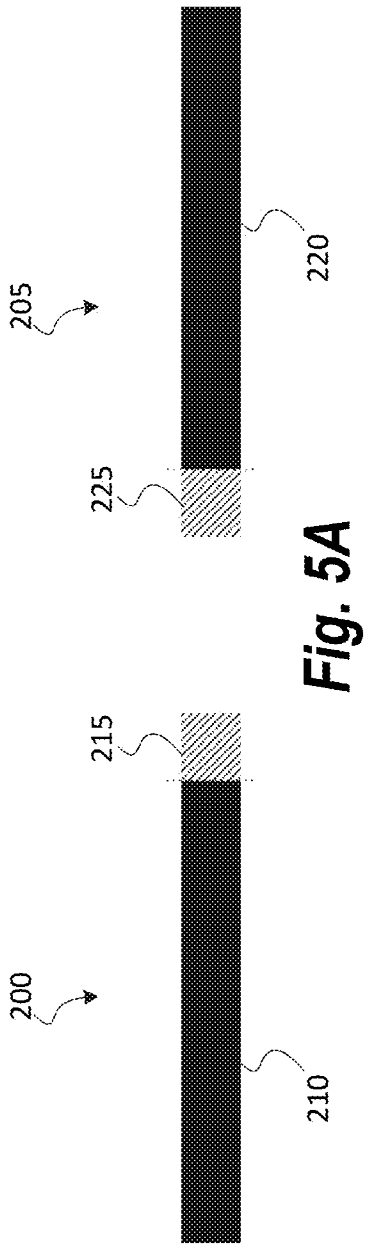
FIG. 5A depicts a pair of single stamps that each include a main printed area and a transition printed area, consistent with disclosed embodiments.
Figure 5B:
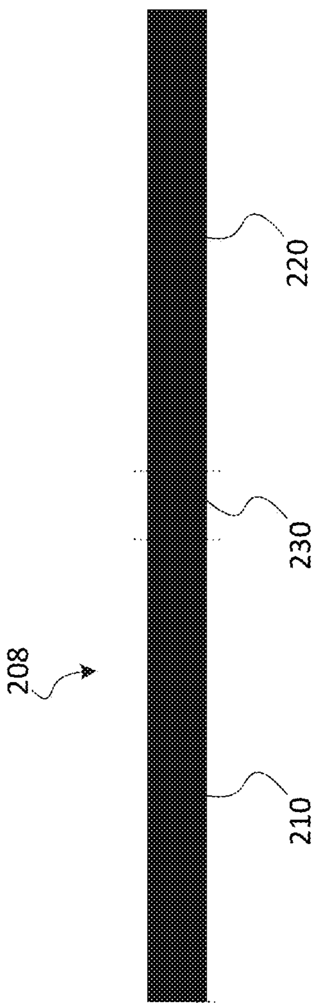
FIG. 5B depicts a linear combined marking that may be produced by printing the stamps of FIG. 5A with the transition printed areas overlapping each other, consistent with disclosed embodiments.

FIG. 5A illustrates a first linear marking 200 and a second linear marking 205. The first linear marking 200 and the second linear marking 205 may be printed markings on a golf ball that create a single continuous linear marking, such as a visual alignment aid. FIG. 5B is an example of a linear marking 208 that may be produced by printing the first linear marking 200 and the second linear marking 205. In FIGS. 5A and 5B, the vertical dotted lines are shown only as boundaries between stamp sections and do not represent printed markings.

The first linear marking 200 includes a main printed area 210 and a transition printed area 215. The transition printed area 215 is positioned at an end of the first linear marking 200 (the right end as shown in FIG. 5A). The second linear marking 205 includes a main printed area 220 and a transition printed area 225. The transition printed area 225 is positioned at an end of the second linear marking 200 adjacent to the transition printed area 215 of the first linear marking 200 (the left end as shown in FIG. 5B). The transition printed areas 215, 225 are configured to be printed at the same location on the golf ball to ensure alignment of the main printed areas 210, 220 when both markings are printed. In FIG. 5B, the transition printed areas 215, 225 are printed in the same location and the resulting appearance of an overlap printed area 230 matches an appearance of the main printed areas 210, 220 to form the continuous linear marking 208. In at least some embodiments, the transition printed areas 215, 225 are configured such that the overlap printed area 230 does not appear darker than the main printed areas 210, 220. As a result, the combined linear marking 208 appears to be one continuous stamp on the golf ball.

There are a variety of methods to quantify the appearance of printed ink. In an exemplary embodiment, the appearance of a marking is quantified using ink density, which is generally a measure of printed ink thickness for solid markings. Ink density can be expressed in units of microns. For example, a finished marking may include an ink density of approximately 5-75 μm. Ink density may be measured using a densitometer. Densitometer measurements (i.e., ink density measurements) are generally representative of a lightness or darkness of a solid marking and do not necessarily identify color. For example, a marking may have ink density measurements associated with each of the CMYK colors. As used herein, comparisons of ink density assume the same color is being measured for an even comparison.

A spectrophotometer is another tool that can be used to quantify an appearance of printed markings. Spectrophotometers are configured to measure various quantifiable properties of a printed marking, including ink density, as well as reflective values, RBG color values, saturation values, etc. Consistent with disclosed embodiments, color standards based on spectrophotometer measurements may be established for determining whether two markings are sufficiently similar such that they have the same appearance. In one example, a spectrophotometer may be configured to output a delta E value, which is a measure of the difference in appearance between two printed markings. A delta E value of 1.0 may be established as a threshold for two markings being sufficiently similar such that an observer cannot identify a difference with a naked eye. Anything lower that 1.0 would be even more similar and thus also within the range of imperceptible difference. Delta E values greater than 1.0 indicate that two markings have appearances (e.g., in color, intensity, darkness, etc.) that are perceptible to the naked eye of an observer.

In some embodiments, the transition printed areas 215, 225 include equally-sized printed areas (e.g., measured in $in.^2$) so that one can be printed over another without changing a perimeter of the printed area. In other embodiments, the transition printed areas 215, 225 may have interlocking shapes, such as a male/female connector design. The transition printed areas 215, 225 may include a different printed appearance (e.g., coloring, shading, etc.) than one or more of the main printed areas 210, 220 and/or the other transition printed area 215, 225. In some embodiments, one of the transition printed areas 215, 225 may match the respectively adjacent main printed area 210, 220 such that only one of the transition printed areas 215, 225 has a different appearance.

Figure 6:
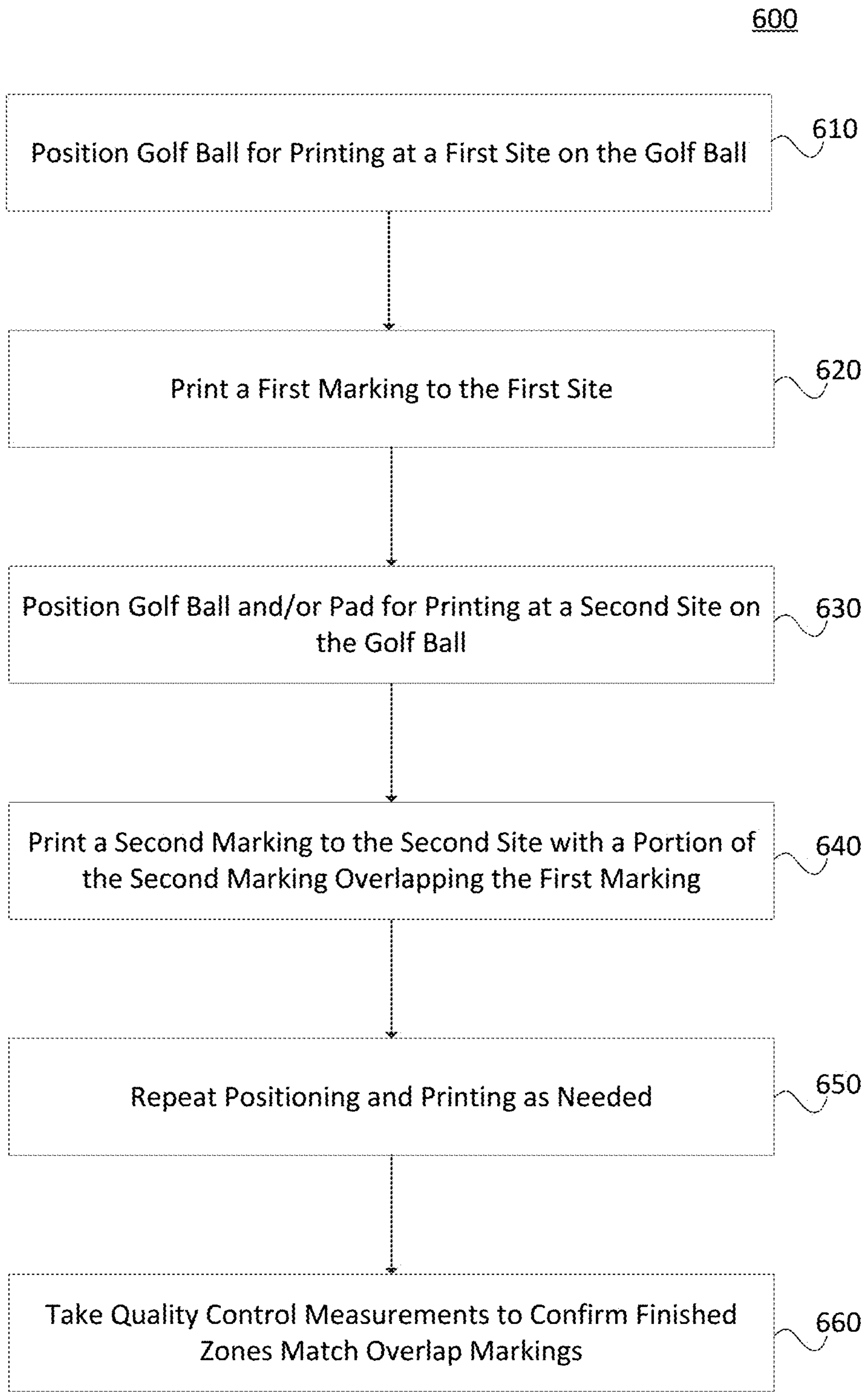
FIG. 6 is a flowchart of an exemplary process for printing a combined marking comprised of more than one stamp, consistent with disclosed embodiments.

FIG. 6 is a flowchart of an exemplary process for printing a marking that is made up of more than one stamp and in which the stamps are applied at different sites on a golf ball. As used herein, a "site" on a golf ball is a surface region coverable by a single pad printing application. Two "sites" may be considered different even if portions of the surface regions overlap, if at least some portions of the surface regions differ. For example, a pad may print on a first site of the golf ball, the golf ball may be rotated 45-90° and the next stamp applied to a newly aligned second site of the golf ball.

In step 610, the golf ball is positioned for printing at a first site. In step 620, a pad receives ink from a printing plate and applies the ink to the first site of the golf ball, thereby producing a first printed area on the golf ball at the first site. For example, the first linear marking 200 may be printed at the first site on the golf ball.

In step 630, the golf ball is positioned for printing at a second site. In one example, the golf ball is rotated for printing at the second site. For instance, the golf ball may be rotated 45-90°. In another example, the printing pad is rotated to print at the second site. In yet another example, a second printing pad is arranged to print at the second site, with or without rotating the golf ball. In step 640, a pad receives ink from a printing plate and applies the ink to the second site of the golf ball, thereby producing a second printed area on the golf ball. For example, the second linear marking 205 may be printed at the second site on the golf ball, with the transition printed area 225 overlapping the transition printed area 215 to produce the combined linear marking 208. The linear marking 208 as printed on the golf ball thus includes the main printed area 210 of the first linear marking 200, the main printed area 220 of the second linear marking 205, and the overlap printed area 230.

In step 650, the golf ball and/or pads may be positioned again, and the printing process repeated as necessary. For example, the golf ball may be rotated an additional 45-90° for printing at a third site on the golf ball, such as to produce the linear marking 100 made up of three single markings and having two overlap printed areas. Further, while a linear marking is described, other combined markings may be produced using this process. For example, multiple colored stamps may be applied to a first site and a second site, with at least two of the different stamps producing overlap printed areas.

As described herein, the disclosed embodiments contemplate overlap printed areas that have the same appearance as adjacent main printed areas of single markings such that an observer cannot easily identify an area where stamps are overlapped. In step 660 of the process 600, a system may perform one or more quality control measurements to confirm main printed areas match overlap printed areas. For example, a densitometer may measure an ink density of a main printed area of a first printed area and an overlap printed area. The two values may be compared to determine whether the printed areas are sufficiently similar, such as whether the measured values fall within a specified tolerance. In another example, a spectrophotometer may be used to compare the printed areas. In one example, the spectrophotometer may measure a delta E value between a main printed area of a first printed area and an overlap printed area to determine whether sufficient similarity exists. In one example, a delta E value of 1.0 or less may be determined to be acceptable. The process may be repeated to compare additional printed areas on a golf ball. For example, the overlap printed area may be additionally compared to a main printed area of a second printed area to ensure consistency across an entire linear marking. In another example, multiple main printed areas of different stamps and/or multiple overlap printed areas may be compared to each other to determine whether sufficient similarity exists following a disclosed printing process.

FIGS. 7A-7D include examples of pairs of printed areas 240, 250, 260, and 270, respectively. Each of the individual printed areas in the pairs 240, 250, 260, 270 may be portions of a single stamp on a golf ball or an entirety of a single stamp. Any of the pairs 240, 250, 260, and 270 may be the transition printed areas 215, 225 of FIG. 5 and printed at the same location on a golf ball to produce an overlap printed area (e.g., the overlap printed area 230). In the embodiments of FIGS. 7A-7D, each of the printed areas in the pairs 240, 250, 260, 270 cover equally-sized areas (e.g., identical rectangular shapes).

Figure 7A:
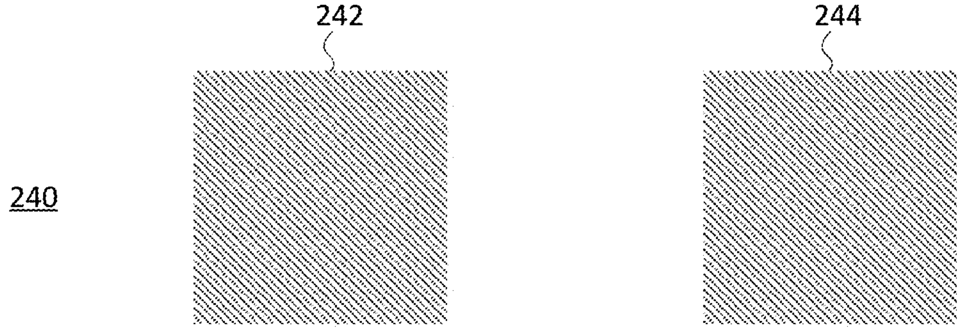
FIGS. 7A-D are depictions of exemplary pairs of transition printed areas for producing an overlap printed area, consistent with disclosed embodiments.

In FIG. 7A, the pair 240 includes a first printed area 242 and a second printed area 244. The first printed area 242 includes a "screened" or "light" appearance due to a relatively low ink density compared to printing a solid color. For example, the first printed area 242 may include an ink density that is approximately half of a desired ink density of a main printed area. In other embodiments, the first printed area 242 may include an ink density that is approximately 5-85% of an ink density of a main printed area. The second printed area 244 may also include a screened appearance. For example, the second printed area 244 may also include an ink density that is approximately half of the desired ink density of the main printed area. Described another way, each of the first printed area 242 and second printed area 244 may include an ink density that is approximately half of an ink density of an adjacent main printed area (Referring to FIG. 5A, the transition printed areas 215, 225 may include an ink density approximately half of an ink density of the adjacent main printed areas 210, 220). As a result, a combination of the first printed area 242 and the second printed area 244 may produce an overlap printed area having a desired ink density that is sufficiently similar to the adjacent main printed areas of the markings while also aiding in alignment of the main printed areas relative to one another.

While transition printed areas that are each roughly 50% of a desired ink density (also referred to herein as a finished ink density) may combine to produce 100% of a desired ink density across an entire overlap printed area, it is contemplated that other combinations may be used and/or necessary to produce a desired appearance. For example, a transition printed area with an ink density less than 50% of a finished ink density may be combined with a transition printed area having more than 50% of the finished ink density (e.g., 30% and 70%). In an exemplary embodiment, a transition printed area may have an ink density that is approximately 5-85% of an adjacent main printed area.

Figure 7B:
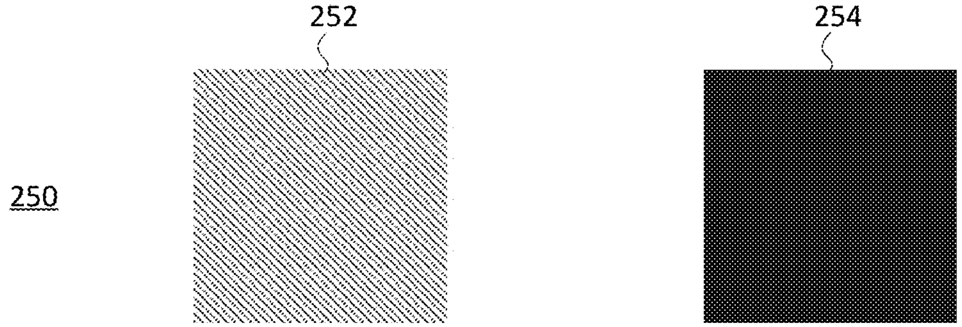

In another example, a combination of two overlapping printed areas may not spread evenly across a surface such that the combination does not produce 100% of a finished ink density (and thus the overlap printed area may not match the adjacent main printed areas of the individual markings). In this way, different combinations of ink densities that theoretically add up to be more than 100% of a finished ink density may be utilized. For example, two similar markings having 50-75% of a finished ink density may be combined and still produce an overlap printed area having a desired ink density that matches the appearance of the adjacent main printed areas. The pair 250 in FIG. 7B provides an alternative example in which a screened first printed area 252 is combined with a darker-appearance second printed area 254. For example, the first printed area 252 may include an ink density between 5-50% of a finished ink density and the second printed area 254 may include an ink density between 50-100% of a finished ink density. The relative ink densities that are used to produce a desired finished ink density may depend on factors including the type of ink, the surface of the item receiving the ink, the size of the stamp, the color of the ink, the type of printing pad, etc.

Figure 7C:
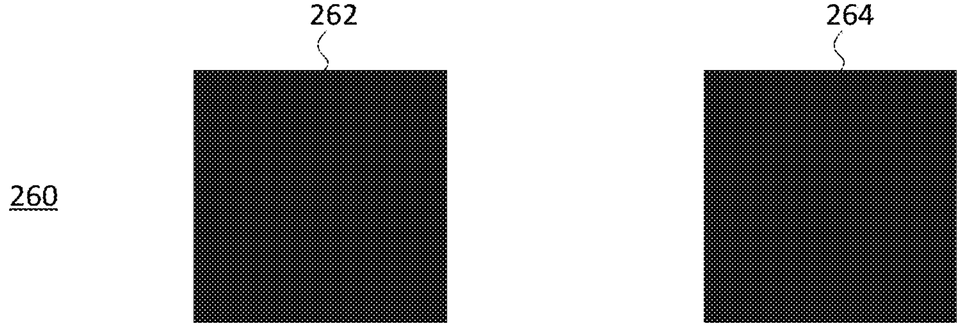
Figure 7D:
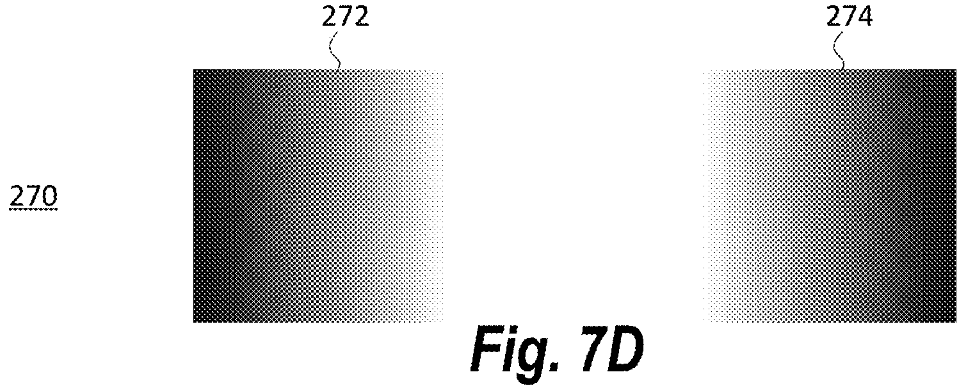

In other embodiments, transition printed areas for producing overlap printed areas may include a gradient configuration, as shown in the pairs 260, 270 of FIGS. 7C and 7D. The pair 260 includes a first printed area 262 and a second printed area 264. The first printed area 262 includes a gradient progressing in a first direction and the second printed area 262 includes a gradient progressing in a second, opposite direction. The gradients of the markings 262, 264 may include discrete sections (e.g., four discrete sections) having progressively different ink densities producing the gradient appearance. The directions of the gradients are configured such that a lightest end of each marking 262, 264 overlaps a darkest end of the opposing marking 262, 264 to produce a consistent appearance of the corresponding overlap printed area. The pair 270 includes a first printed area 272 and a second printed area 274. The first and second printed areas 272, 274 have a similar gradient appearance to markings 262, 264 but differs by having a continuous gradient (e.g., pixelated gradient) instead of the discrete gradients of FIG. 7C. The first and second printed areas 272, 274 include gradients in opposing directions to produce a consistent appearance when overlapped having a desired ink density.

Figure 8A:
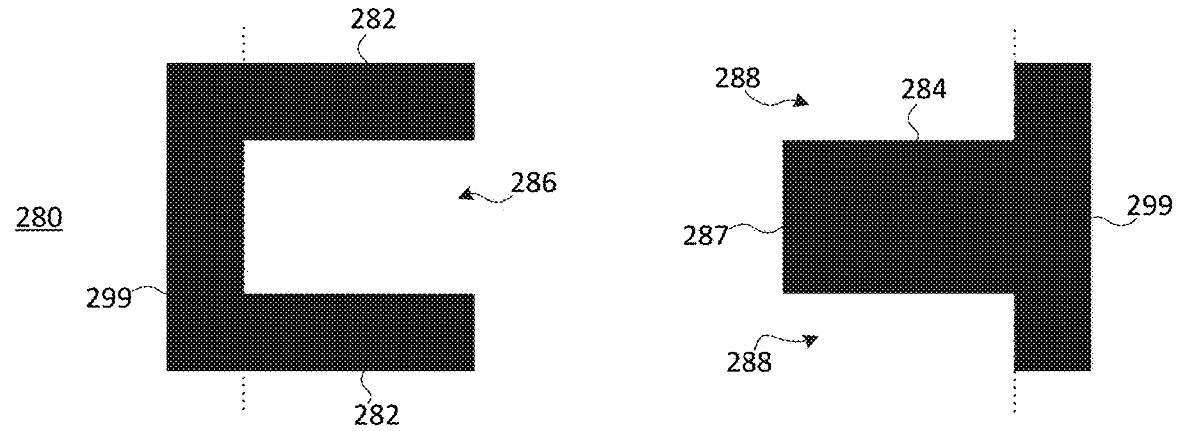
FIGS. 8A-8C are depictions are additional exemplary pairs of transition printed areas, including interlocking features, for producing an overlap printed area, consistent with disclosed embodiments.
Figure 8B:
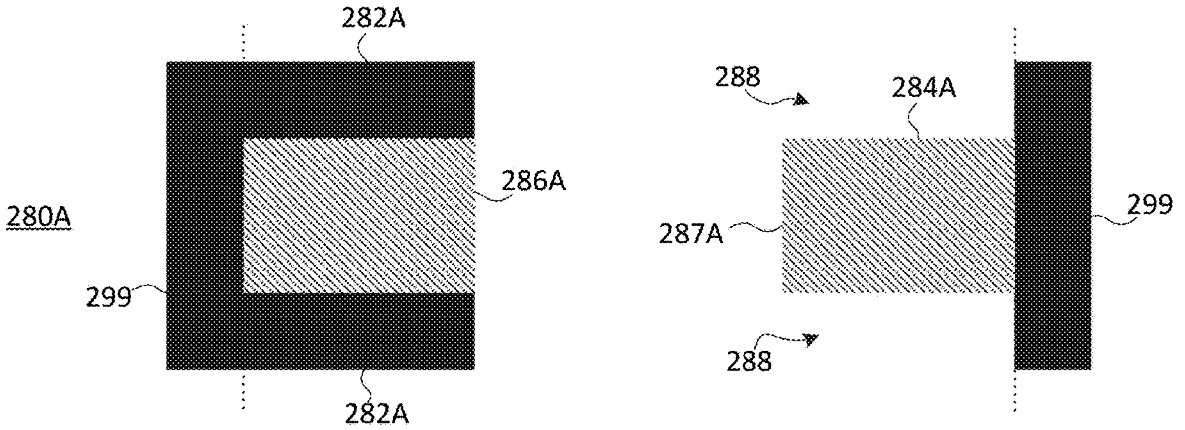
Figure 8C:
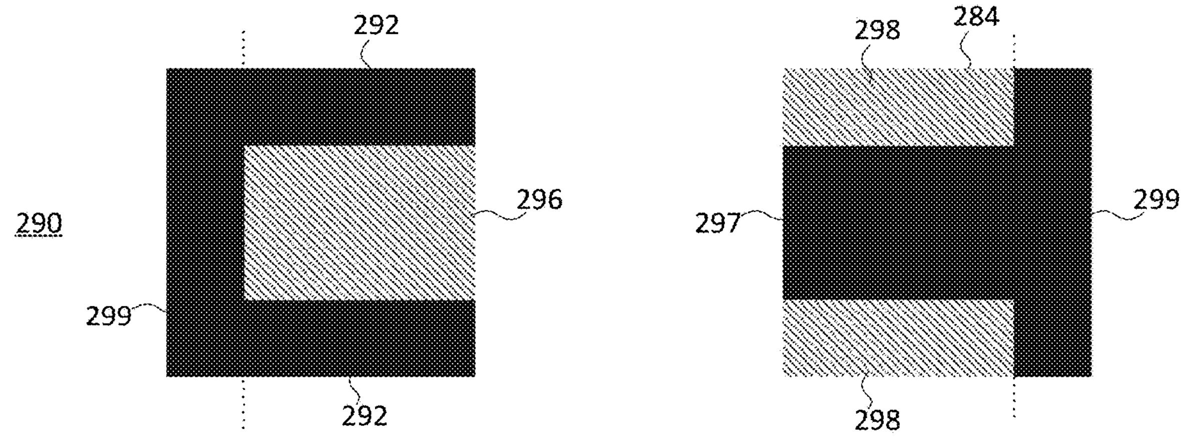

FIGS. 8A-8C include additional examples of transition printed area pairs 280, 280A, and 290. The pairs 280, 280A, 290 include printed areas having interlocking features. The pair 280 includes a first printed area 282 and a second printed area 284. The pair 280A includes a first printed area 282A and a second printed area 284A. The pair 290 includes a first printed area 292 and a second printed area 294 that are similar to the markings 282, 284.

FIGS. 8A-8C further show a portion of an adjacent main printed area 299 for each marking 282, 284, 282A, 284A, 292, 294 in the pairs 280, 280A, 290. The main printed areas 299 are each delineated by a dotted line which forms no part of an actual marking and is shown only as a boundary. The main printed areas 299 include an ink density that is approximately the same as the ink density of a printed area created by printing any of the pairs 280, 280A, 290 at the same location. As shown, the printed areas 282, 282A, 292 include a main printed area 299 to the left of the transition printed area and printed areas 284, 284A, 294 include a main printed area 299 to the right of the transition printed area.

In the pair 280, the first printed area 282 includes a bracketed appearance forming a cavity 286 and the second printed area 284 includes a projection 287 from the adjacent main printed area 299 configured to fit into the cavity 286. The projection 287 is bounded by a pair of cavities 288 that form a discontinuity with the adjacent main printed area 299. The printed areas 282, 284 may be printed to “overlap” in that they interlock with each other to produce a continuous marking. The ink density of the markings 282, 284 may be the same as the ink density of adjacent main printed areas 299. The interlocking feature may help to ensure alignment of the adjacent markings (e.g., to produce a continuous linear marking in combination with no deviation in direction). The pair 280A may be similar to the pair 280, with the cavity 286A instead being a screened printed area and the printed area 284A including a projection 287A also being a screened printed area such that a combination of the printed areas 286A, 287A producing an overlap printed area having an ink density that is approximately the same as the printed areas 282A and 299.

In the pair 290, the first printed area 292 also includes a bracketed appearance and the second printed area 294 includes a projection 288 from the adjacent main printed area 299. However instead of blank spaces, the markings 292, 294 include screened sections 296, 298 to complete a rectangle. In this way, the markings 292, 294 overlap by interlocking and overlaying in certain portions. In both examples, a resulting overlap printed area may include a consistent appearance that matches an appearance of the adjacent main printed areas that are composed of a single stamp (e.g., a matching ink density).

In the pairs 280A and 290B, the printed areas include main sections that interlock and overlap sections that overlay each other (with some sections performing both functions). For example, in FIG. 8B, the printed areas 282A and 287A may be main sections that interlock and the printed areas 286A and 287A may be overlap sections that overlay each other. In FIG. 8C, the printed areas 292 and 297 may be main sections that interlock and all of the printed areas 292, 296, 297, 298 may be overlap sections that overlay each other. The combination of these features may assist in alignment of the two stamps relative to each other while producing a desired appearance.

The disclosed embodiments include linear markings that require more than a single stamp to produce the length or size of marking desired. For example, disclosed embodiments can produce linear markings that extend from 60-360° around the golf ball. The disclosed markings having transition printed areas enable the combination of two or more stamps to overlap and produce an overlap printed area that matches an appearance of adjacent main printed areas that are composed of a single stamp, as well as providing features to aid in alignment of the stamps relative to each other. The linear markings can have a consistent one-color appearance or may be multi-colored. Markings produced by disclosed embodiments do not need to be a consistent shape. Markings also do not need to be continuous in appearance (e.g., printed areas can include spaces of blank or non-printed areas therebetween). Combined markings may include letters, numbers, characters, symbols, arrows, etc., that are arranged in a linear direction. The disclosed features may be applied to these and other marking designs to produce a consistent appearance in which the overlap of two stamps is not identifiable to the naked eye of an observer.

Figure 9A:
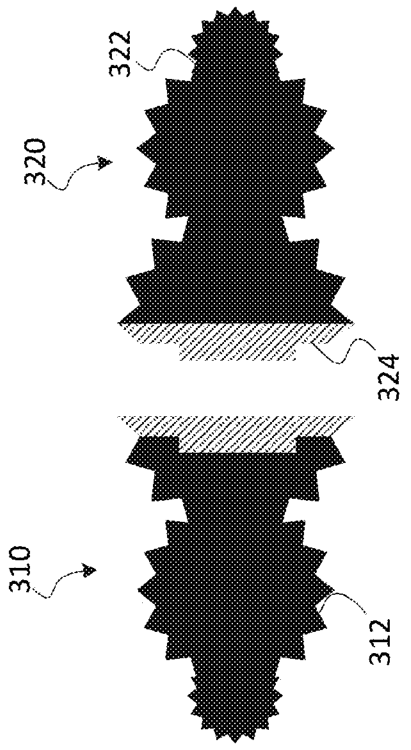
FIG. 9A depicts another example of a pair of single stamps that each include a main printed area and a transition printed area, consistent with disclosed embodiments.
Figure 9B:
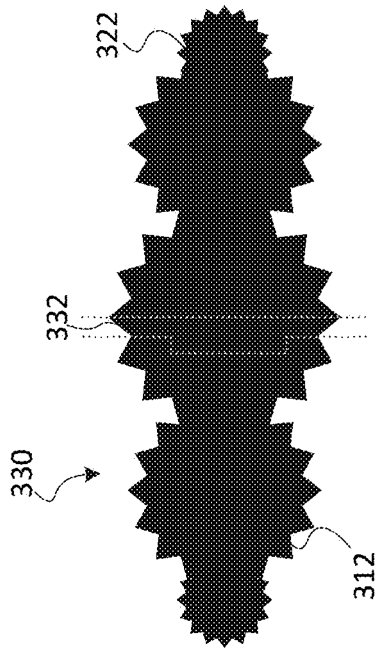
FIG. 9B depicts a combined marking produced by printing the stamps of FIG. 9A with the transition printed areas overlapping each other, consistent with disclosed embodiments.

FIGS. 9A-9B, 10A-10B, 11A-11B, and 12A-12B include additional examples of applications of the disclosed embodiments. In FIGS. 9A-9B, a first printed area 310 and a second printed area 320 may be separately stamped on a golf ball (not shown) to produce a combined marking 330. The combined marking 330 may be a logo or other indicia that is more complex than the linear markings described above. For example, the combined marking 330 may include multiple shapes or pictures that extend across enough of a surface of the golf ball such that more than one stamp at different sites is necessary to produce the combined marking 330.

The first printed area 310 may include a main printed area 312 and a transition printed area 314. The second printed area 320 may include a main printed area 322 and a transition printed area 324. The transition printed areas 314, 324 may include one or more of the transition printed area features described herein, such as a screened or gradient appearance and/or interlocking features such that overlapped printing of the transition printed areas 314, 324 produces an overlap printed area 332 having an appearance that matches at least a portion of one or more of the main printed areas 312, 322. For example, the overlap printed area 332 may include an ink density that is approximately the same as immediately adjacent portions of the main printed areas 312, 322 (i.e., the adjacent portions of the shape that includes the transition printed areas 314, 324). In FIG. 9B, the main printed areas 312, 322 are each delineated from the overlap printed area 332 by a dotted line which forms no part of an actual marking and is shown only as a boundary.

Figure 10A:
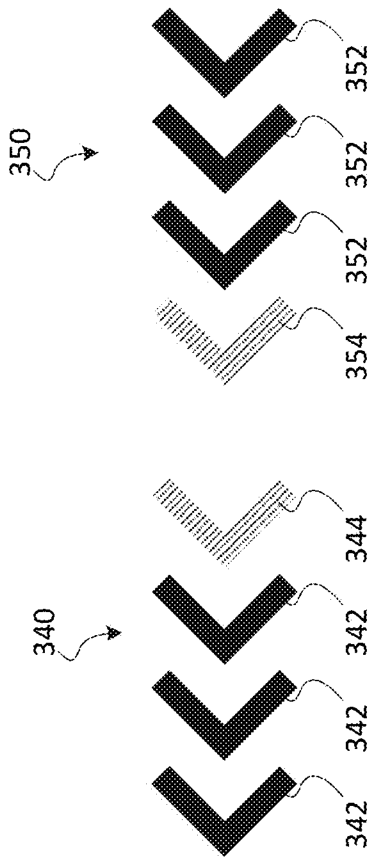
FIG. 10A depicts another example of a pair of stamps the each include spaced printed areas, wherein the spaced printed areas include a main printed area and a transition printed area, consistent with disclosed embodiments.
Figure 10B:
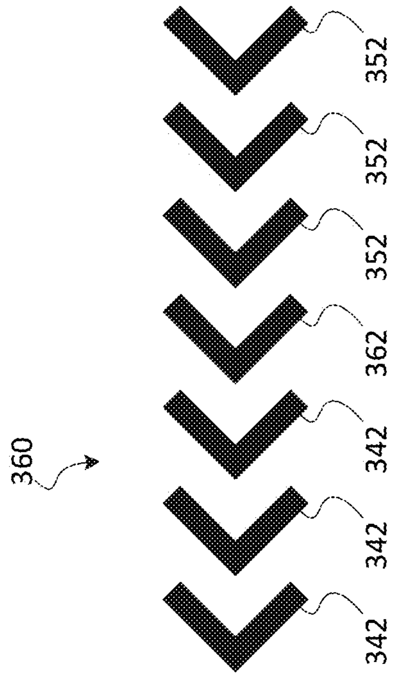
FIG. 10B depicts a combined marking produced by printing the stamps of FIG. 10A with the transition printed areas overlapping each other, consistent with disclosed embodiments.

FIGS. 10A-10B depict another embodiment and includes a first stamp 340 and a second stamp 350. Each of the first stamp 340 and the second stamp 350 include spaced printed shapes (i.e., printed areas that are separated by blank or non-printed areas). In the embodiment of FIGS. 10A-10B, the stamps 340, 350 include spaced arrows pointing in a common direction. The stamp 340 include a main printed area 342 and a transition printed area 344. The stamp 350 includes a main printed area 352 and a transition printed area 354. The stamps 340, 350 may be printed on a golf ball (not shown) such that the transition printed areas 344, 354 are printed at the same location and thus overlap one another. The resulting combined marking 360 may include an overlap printed area 362 at the location of the printing of the transition printed areas 344, 354.

In an exemplary embodiment, the main printed areas 342, 352 each include at least one of the spaced printed shapes (e.g., one or more of the arrows). The transition printed areas 344, 354 each include at least one of the spaced printed shapes (e.g., one or more of the arrows). The printed shapes in the main printed areas 342, 352 may be printed in a finished ink density while the printed shapes in the transition printed areas 344, 354 may be printed with an ink density that is the same as or similar to any of the other transition printed areas described herein. For example, the transition printed areas 344, 354 may each be printed with a screened appearance or gradient comprised of less than 100% of the finished ink density of the main printed areas 342, 352. As a result, the overlap printed area 362 may be a spaced printed shape that includes an appearance matching the spaced printed shapes in the main printed areas 342, 352. For example, the overlap printed area 362 may be an arrow that matches color and appearance of the other arrows in the combined marking 360.

Figure 11A:
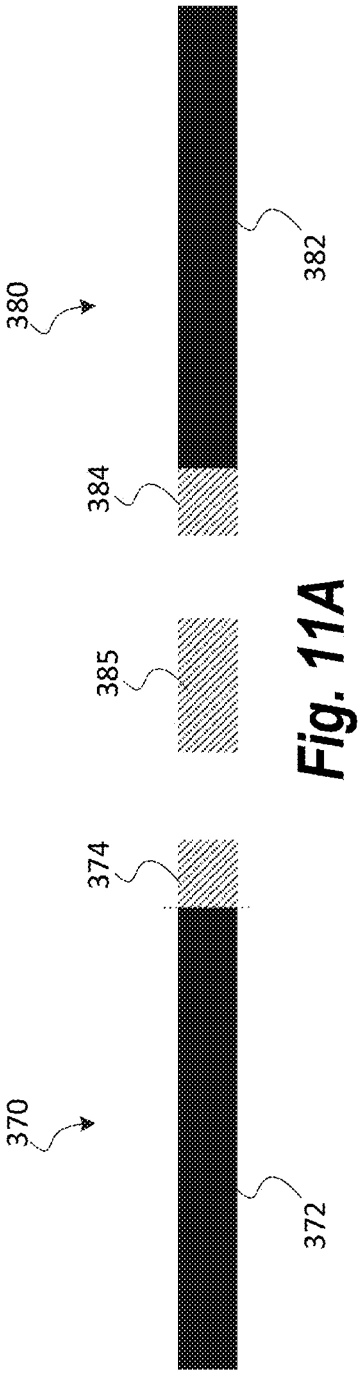
FIG. 11A depicts another example of a pair of stamps that each include a main printed area and a transition printed area, and also includes a supplemental transition printed area, consistent with disclosed embodiments.
Figure 11B:
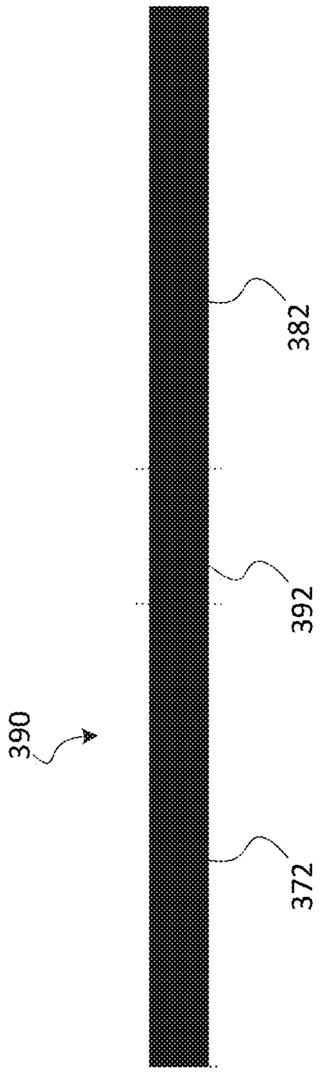
FIG. 11B depicts a combined marking produced by printing the stamps of FIG. 11A with the transition printed areas overlapping portions of the supplemental transition printed area, consistent with disclosed embodiments.

FIGS. 11A-11B depict another embodiment and include a first linear marking 370, a second linear marking 380, and a third linear marking 385 which may be printed to produce a combined linear marking 390. The combined linear marking 390 may be similar to the combined linear marking 208, such as a single continuous linear marking, such as a visual alignment aid. In FIGS. 11A and 11B, the vertical dotted lines are shown only as boundaries between stamp sections and do not represent printed markings.

The first linear marking 370 includes a main printed area 372 and a transition printed area 374. The transition printed area 374 is positioned at an end of the first linear marking 370 (the right end as shown in FIG. 5A). The second linear marking 380 includes a main printed area 382 and a transition printed area 384. The transition printed area 384 is positioned at an end of the second linear marking 380 adjacent to the transition printed area 274 of the first linear marking 370 (the left end as shown in FIG. 5B). Unlike the embodiment of FIGS. 5A-5B, the transition printed areas 374, 384 may not be printed at the same location on the golf ball (i.e., the transition printed areas 374, 384 do not overlap each other). Instead, the transition printed area 374 may be printed to overlap a first portion of the third linear marking 385 and the transition printed area 384 may be printed to overlap a second portion of the third linear marking 385. In FIG. 11B, the transition printed areas 374, 384 are printed to overlap the third linear marking 385 which serves as a supplemental transition printed area and the resulting appearance of an overlap printed area 392 matches an appearance of the main printed areas 372, 382 to form the continuous linear marking 390. In this embodiment, the transition printed areas 374, 384, and the third linear marking 385, as the supplemental transition printed area, individually include ink densities less than an ink density of the main printed areas 372, 382. However, the separate but adjacent combinations of the transition printed areas 374, 384 and the third linear marking 385 produce the ink density of the main printed areas 372, 382. As a result, the combined linear marking 390 appears to be one continuous stamp on the golf ball.

Figure 12A:
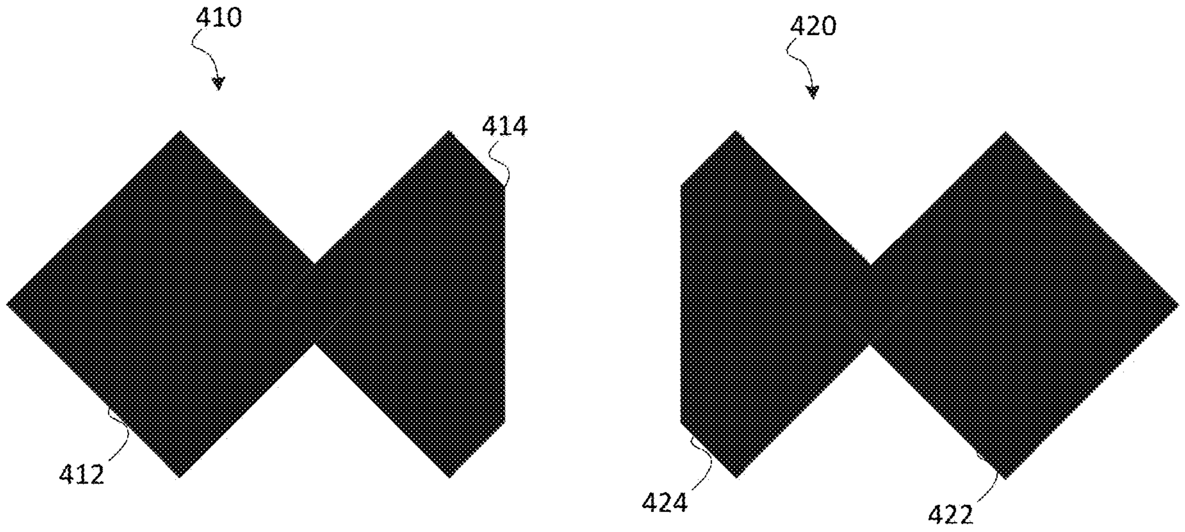
FIG. 12A depicts a pair of colored stamps that each include a main printed area and a transition printed area, consistent with disclosed embodiments.
Figure 12B:
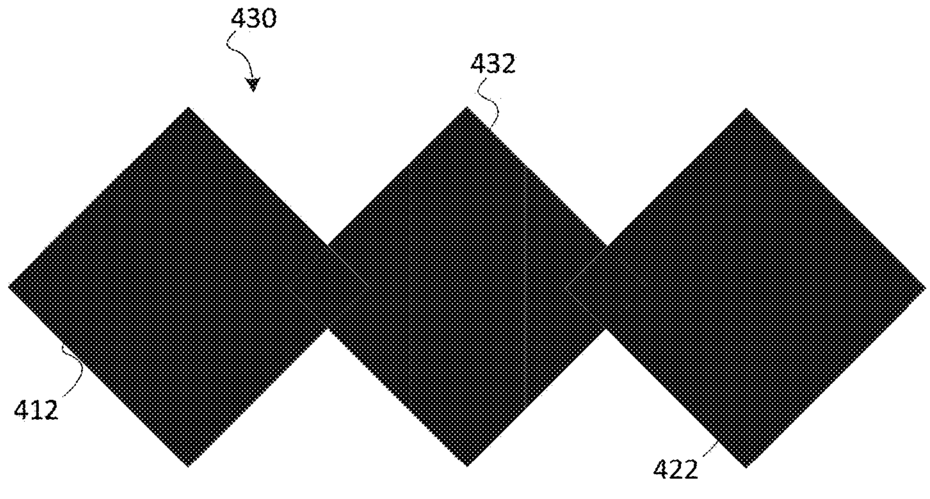
FIG. 12B depicts a combined colored marking produced by printing the stamps of FIG. 12A with the transition printed areas overlapping each other, consistent with disclosed embodiments.

FIGS. 12A-12B depict an alternative embodiment related to designs that include multiple colored and/or otherwise distinct sections. Transition printed areas as described in at least some of the above embodiments include features to produce an overlap printed area that matches an appearance of adjacent main printed area (i.e., sufficient similarity based on ink density). In other embodiments, two markings may include transition printed areas that combine to produce a distinct component of an overall indicia design.

In FIGS. 12A-12B, a stamp 410 and a second stamp 420 may be printed by separate single pad hits on a golf ball (not shown) that combine to produce a combined marking 430. The first stamp 410 may include a main printed area 412 and a transition printed area 414. The main printed area 412 and the transition printed area 414 may be printed in a first color. The second stamp 420 may include a main printed area 422 and a transition printed area 424. The main printed area 422 and the transition printed areas 424 may be printed in a second color, which may or may not be the same as the first color.

In an exemplary embodiment, the transition printed areas 414, 424 may be configured to be printed at the same location on the golf ball to produce an overlap printed area 432 forming a distinct section of the overall stamp design. The overlap printed area 432 may be a combination of the first color and the second color to produce a third color. In one example, the first color is red, the second color is yellow, and the third color is orange (a combination of red and yellow ink being printed on top of one another). In another example, the first color and the second color are the same color (e.g., blue) and the third color is different, darker version of that color as a result of having a greater ink density at the overlap printed area 432. In another embodiment, a gradient or ombre appearance of colors may be produced by overlapping colored transition zones. In the embodiment of FIGS. 12A-12B, the overlapping of two transition printed areas may be utilized to add to an overall stamp design, such as to introduce a new color into the design, while additionally helping to align adjacent separate stamps during printing to ensure proper positioning on the golf ball.

The disclosed embodiments describe stamp designs that may be printed to produce combined markings on golf balls or other items. The single stamps include features, such as transition printed markings, that overlap with portions of other stamps to help align the stamps relative to each other and produce a desired combined appearance, such as a shading, lightness/darkness, color, etc., that matches the adjacent single stamp printed areas. The disclosed stamp designs may be pad printed using printing plates configured to produce the desired printed areas that make up the stamps.

Figure 13A:
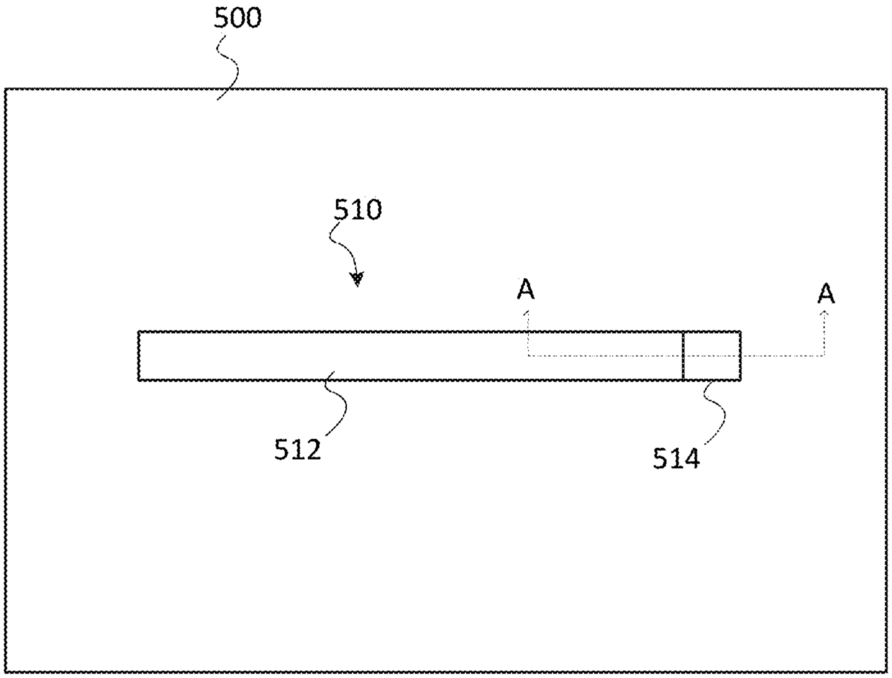
FIG. 13A is a top view of a printing plate including an etching pattern for printing a linear marking having a main printed area and a transition printed area, consistent with disclosed embodiments.
Figure 13B:
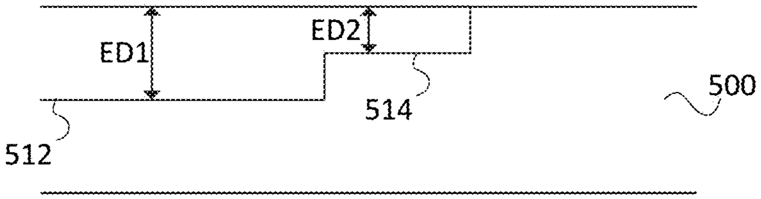
FIG. 13B is a cross-sectional view of the printing plate of FIG. 13A, taken along line A-A, showing a portion of the etching pattern corresponding to the main printed area and a portion of the etching pattern corresponding to the transition printed area, according to a first embodiment.

FIG. 13A is a top view of an embodiment of a printing plate 500 that may be used in a disclosed process, such as a pad printing process. FIG. 13B is a cross-sectional view of the printing plate 500, taken at line A-A of FIG. 13A.

The printing plate 500 includes an etching pattern 510. The etching pattern 510 may be one or more depressions or wells formed in a surface of the printing plate 500. The etching pattern 510 may be configured to receive ink for pad printing on a golf ball to produce a marking. The etching pattern 510 includes different sections having varying etch depths (ED) that correspond to different portions of the marking to be printed on the golf ball, such as a main printed area and a transition printed area. As described herein, a transition printed area may include a lesser ink density than a main printed area. The printing plate 500 may include the variation in etch depth in order to achieve the variation in ink density in the marking.

In a first embodiment, the etching pattern 510 includes a first etch section 512 and a second etch section 514. The first etch section 512 includes a first etch depth ED1 and the second etch section 514 includes a second etch depth ED2. According to an exemplary embodiment, the first etch depth ED1 may be approximately 10-22 μm. In another embodiment, the first etch depth ED1 may be approximately 15-17 μm.

The second etch depth ED2 is less than the first etch depth ED1 such that the first etch section corresponds to a portion of a marking that is a main printed area and the second etch section 514 corresponds to a portion of a marking that is a transition printed area. For example, the second etch depth ED2 may approximately 5-85% of the first etch depth ED1. For instance, in one embodiment, the second etch depth ED2 may be approximately 0.5-18.7 μm. In another embodiment, the second etch depth ED2 may be approximately 0.75-14.5 μm. As a result, the printing plate 500 may be used to produce a marking having a main printed area with a finished ink density and a transition printed area with an ink density less than the finished ink density. The printing plate 500 may be used in combination with another printing plate for producing a second stamp also having a transition printed area to overlap the transition printed area produced using the printing plate 500. For example, another printing plate may include an etching pattern that is a mirror image of the etching pattern 510 (e.g., the second etch section on the opposite end of the first etch section). Other combinations of printing plates having varying etch depths may also be used to produce a desired stamp design.

Figure 13C:
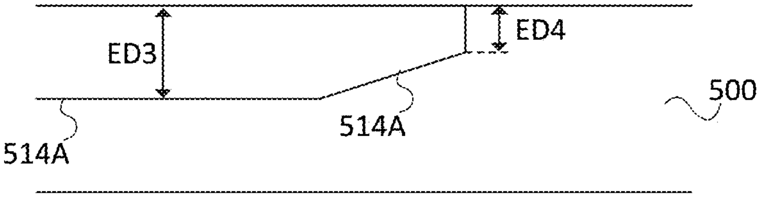
FIG. 13C is another cross-sectional view of the printing plate of FIG. 13A, taken along line A-A, showing a portion of the etching pattern corresponding to the main printed area and a portion of the etching pattern corresponding to the transition printed area, according to a second embodiment.
Figure 13D:
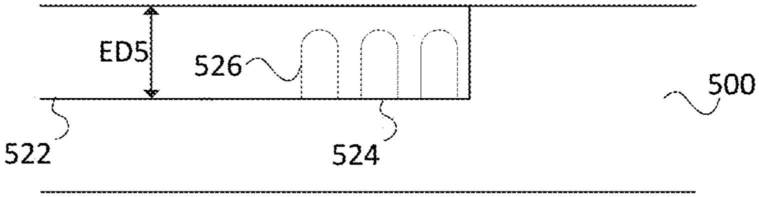
FIG. 13D is an alternative cross-sectional view of a printing plate, showing a portion of an etching pattern corresponding to the main printed area and a portion of an etching pattern corresponding to the transition printed area, according to a second embodiment.

In the embodiment of FIG. 13B, the first etch section 512 and the second etch section 514 are have a step configuration to produce two sections having constant etch depths. However, other embodiments may have other configurations. FIG. 13C includes an alternative cross-sectional design for the printing plate 500, including a first etch section 512A and a second etch section 514A. The first etch section 512A includes a constant etch depth ED3 while the second etch section gradually increases in depth from the etch depth ED3 to a terminal etch depth ED4. The etch depth ED3 may be the same as the ED1 in some embodiments (e.g., 15-17 μm). In some embodiments, the etch depth ED4 may be a small fraction (e.g., 5-10%) of the etch depth ED3 (e.g., 0.75-1.5 μm). In other embodiments, the etch depth ED4 may be zero such that the second etch section 514A gradually transitions into the surface of the printing plate 500. Additional embodiments may include other configurations for the first and/or second etch section, such as a curved or actuate configuration for the second etch section. In some embodiments, an etch depth may remain constant between different sections while an etch volume is varied. For example, FIG. 13D includes another alternative cross-sectional design for the etching pattern 510, including a first etch section 522 and a second etch section 524. The first etch section 522 and the second etch section 524 include the same etch depth ED5, however, the second etch section 524 include protrusions 526 to lessen the volume of the second etch section 524 and thereby produce a stamp section with a lesser ink density compared to a stamp section produced by the first etch section 522.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

The invention claimed is:

1. A method for printing a marking on a golf ball, comprising:

arranging a golf ball relative to a first printing pad for printing at a first site on a surface of the golf ball;

printing a first stamp on the first site with the first printing pad, wherein the first stamp comprises a main printed area and a transition printed area;

arranging the golf ball relative to a second printing pad for printing at a second site on the surface of the golf ball; and printing a second stamp on the second site with the second printing pad, wherein the second stamp comprises a main printed area and a transition printed area, wherein the first stamp and the second stamp are printed on the surface of the golf ball such that the transition printed area of the first stamp overlaps the transition printed area of the second stamp to create an overlap printed area between the main printed area of the first stamp and the main printed area of the second stamp, and wherein an ink density of the main printed area of the first stamp, an ink density of the main printed area of the second stamp, and an ink density of the overlap printed area are approximately the same after both the first stamp and the second stamp are printed on the surface of the golf ball.

2. The method of claim 1, wherein the first stamp is a linear marking extending in in a first circumferential direction around at least 30° of a great circle of the golf ball.

3. The method of claim 2, wherein the second printed area is a linear marking extending in the first circumferential direction around at least 30° of the golf ball.

4. The method of claim 1, wherein the transition printed area of the first stamp and the transition printed area of the second stamp are equally-sized areas.

5. The method of claim 4, wherein the transition printed area of the first stamp comprises 5-85% of an ink density of the main printed area of the first stamp.

6. The method of claim 5, wherein the transition printed area of the second stamp comprises 5-85% of an ink density of the main printed area of the second stamp.

7. The method of claim 4, wherein the transition printed area of the first stamp comprises a directional gradient.

8. The method of claim 7, wherein the transition printed area of the second stamp comprises a directional gradient in an opposite direction of the transition printed area of the first stamp.

9. The method of claim 4, wherein the transition printed area of the first stamp and the transition printed area of the second stamp each comprise a main section and an overlap section, wherein the main sections are interlocking and the overlap sections overlay each other.

10. The method of claim 1, wherein the first printing pad and the second printing pad are the same printing pad.

11. The method of claim 10, wherein arranging the golf ball relative to the second printing pad comprises rotating the golf ball.

12. The method of claim 1, further comprising printing a third stamp on a third site with a third printing pad, the third stamp comprising a main printed area and a transition printed area, wherein the second stamp comprises a second transition printed area, wherein the transition printed area of the third stamp overlaps the second transition printed area of the second stamp to create a second overlap printed area between the main printed area of the second stamp and the main printed area of the third stamp.

13. The method of claim 12, wherein the first stamp, the second stamp, and the third stamp are linear markings that combine to extend in a circumferential direction around approximately 180° of a great circle of the golf ball.

14. The method of claim 1, further comprising measuring an ink density of the overlap printed area and at least one of the main printed areas of the first or second stamp.

15. The method of claim 14, wherein measuring the ink density comprises measuring with at least one of a densitometer or a spectrophotometer.

16. The method of claim 1, wherein a delta E value between the overlap printed area and the main printed areas of the first and second stamps is 1.0 or less, as measured by a spectrophotometer.

* * * * *